United States Patent
Lee et al.

(10) Patent No.: US 9,495,758 B2
(45) Date of Patent: Nov. 15, 2016

(54) DEVICE AND METHOD FOR RECOGNIZING GESTURE BASED ON DIRECTION OF GESTURE

(71) Applicant: SAMSUNG ELECTRONICS CO., LTD., Suwon-si (KR)

(72) Inventors: Kyoobin Lee, Seoul (KR); Hyun Surk Ryu, Hwaseong-si (KR); Jun Haeng Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 13/955,030

(22) Filed: Jul. 31, 2013

(65) Prior Publication Data

US 2014/0037139 A1 Feb. 6, 2014

(30) Foreign Application Priority Data

Aug. 1, 2012 (KR) .................. 10-2012-0084460

(51) Int. Cl.
| | |
|---|---|
| *G06T 7/20* | (2006.01) |
| *G06F 3/03* | (2006.01) |
| *G06F 3/01* | (2006.01) |
| *G06K 9/00* | (2006.01) |
| *G06F 3/0346* | (2013.01) |

(52) U.S. Cl.
CPC ............... *G06T 7/20* (2013.01); *G06F 3/017* (2013.01); *G06F 3/0304* (2013.01); *G06F 3/0346* (2013.01); *G06K 9/00355* (2013.01); *G06K 9/00402* (2013.01); *G06T 7/2066* (2013.01)

(58) Field of Classification Search
None
See application file for complete search history.

(56) References Cited

U.S. PATENT DOCUMENTS

| | | | |
|---|---|---|---|
| 7,650,017 B2 | 1/2010 | Yamada | |
| 7,728,269 B2 | 6/2010 | Lichtsteiner et al. | |
| 8,983,127 B2 * | 3/2015 | Gupta | G06T 7/2086 348/169 |
| 2008/0192005 A1 | 8/2008 | Elgoyhen et al. | |
| 2009/0238406 A1 * | 9/2009 | Huang | G06F 17/5009 382/103 |
| 2009/0265671 A1 * | 10/2009 | Sachs | G06F 3/017 715/863 |
| 2009/0278915 A1 * | 11/2009 | Kramer | G06K 9/00375 348/48 |
| 2010/0103106 A1 * | 4/2010 | Chui | G06F 3/017 345/166 |
| 2010/0313050 A1 | 12/2010 | Harrat et al. | |
| 2012/0008867 A1 * | 1/2012 | Hara | G06T 7/2026 382/191 |
| 2012/0071891 A1 | 3/2012 | Itkowitz et al. | |
| 2013/0194173 A1 * | 8/2013 | Zhu | G06F 3/011 345/156 |
| 2013/0342636 A1 * | 12/2013 | Tian | G06F 3/017 348/14.08 |
| 2014/0157210 A1 * | 6/2014 | Katz | G06F 3/017 715/863 |
| 2015/0130709 A1 * | 5/2015 | Dangi | G06F 3/0383 345/156 |
| 2015/0185859 A1 * | 7/2015 | Yamamoto | G06F 3/017 345/156 |

FOREIGN PATENT DOCUMENTS

| | | |
|---|---|---|
| KR | 10-2010-0086141 A | 7/2010 |
| KR | 10-2012-0035529 A | 4/2012 |
| WO | 2010/141878 A1 | 12/2010 |

OTHER PUBLICATIONS

Ke et al. "Real-time Hand Gesture Recognition for Service Robot," 2010 International Conference on Intelligent Computation Technology and Automation, IEEE, vol. 2, pp. 976-979.*
Communication dated Oct. 5, 2015 issued by European Patent Office in counterpart European Patent Application No. 13178372.2.

(Continued)

*Primary Examiner* — Soo Shin
(74) *Attorney, Agent, or Firm* — Sughrue Mion, PLLC

(57) ABSTRACT

A device and method for recognizing a gesture according to movement directions of an object.

15 Claims, 8 Drawing Sheets

(56) References Cited

OTHER PUBLICATIONS

Caridakis et al., "SOMM: Self organizing Markov map for gesture recognition", Pattern Recognition Letters, Sep. 8 2009, 8 pages total, vol. 31 No. 1, Elsevier, Athens, Greece.

Nishikawa et al., "Description and Recognition of Human Gestures Based on the Transition of Curvature from Motion Images", Automatic Face and Gesture Recognition, Apr. 14, 1998, 6 pages total, IEEE, Japan.

* cited by examiner

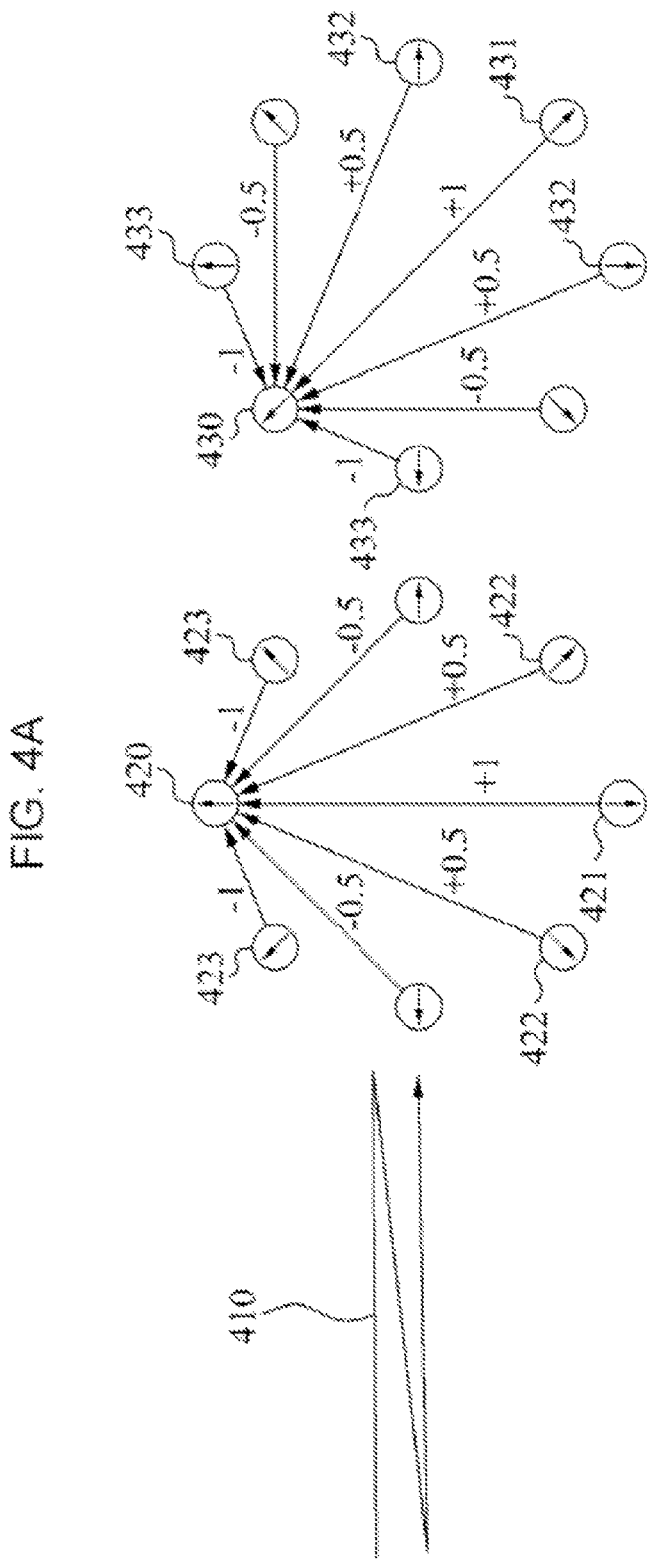

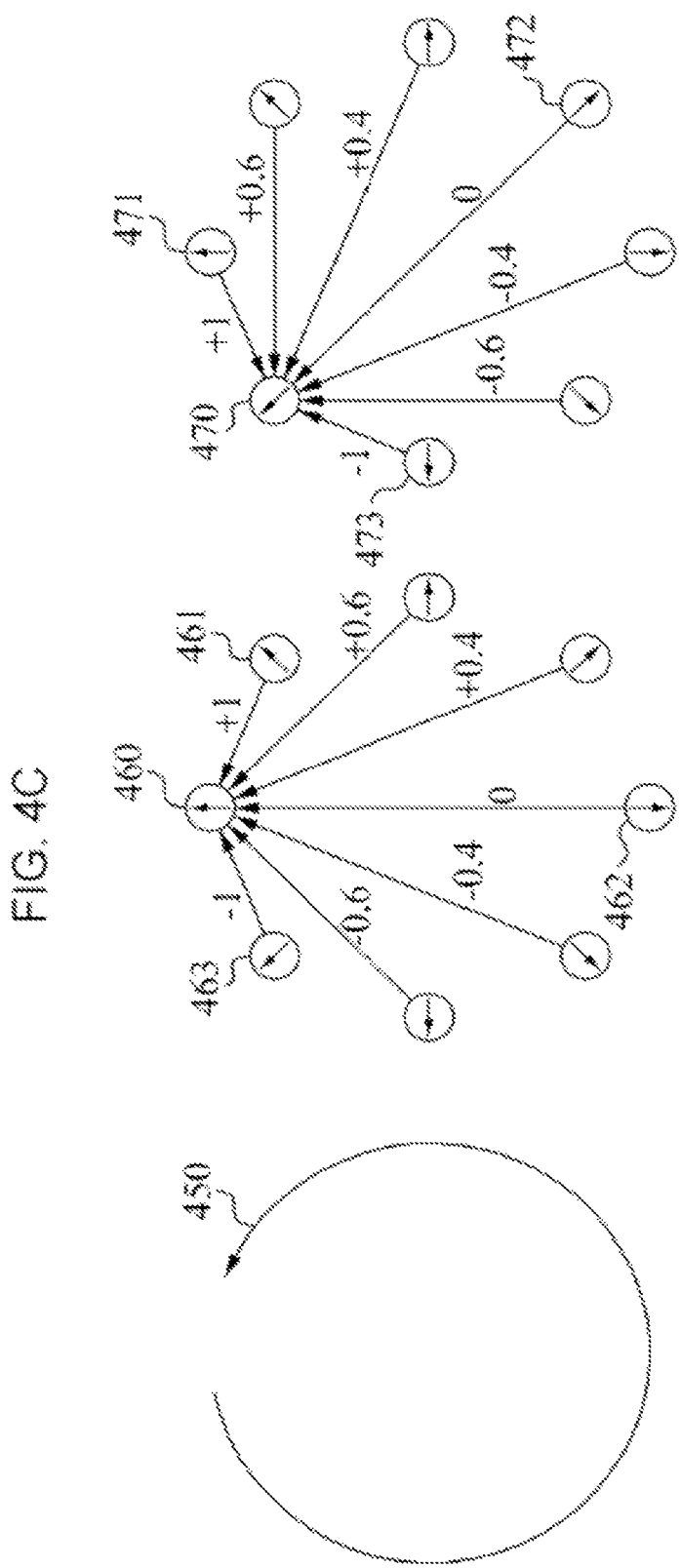

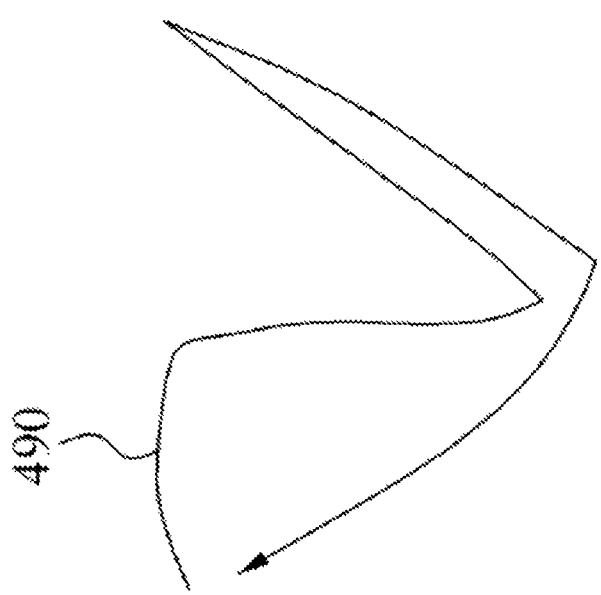
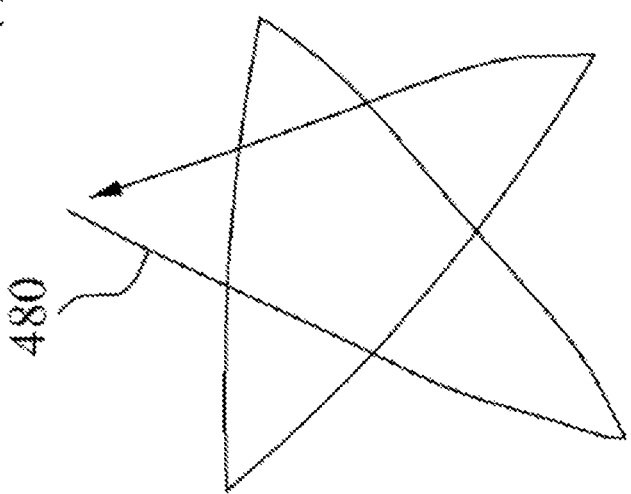
FIG. 4D

DEVICE AND METHOD FOR RECOGNIZING GESTURE BASED ON DIRECTION OF GESTURE

CROSS-REFERENCE TO RELATED APPLICATION

This application claims priority from Korean Patent Application No. 10-2012-0084460, filed on Aug. 1, 2012, in the Korean Intellectual Property Office, the disclosure of which is incorporated herein by reference in its entirety.

BACKGROUND

1. Field

Methods and apparatuses consistent with the exemplary embodiments relate to a device and method for recognizing a gesture based on a direction of the gesture.

2. Description of the Related Art

Gesture recognition may be applied as a means of communication between a human and a computer in various fields, for example, intelligent robots, games, simulations, manufacturing techniques, and the like. In particular, gesture recognition may obtain video data or a plurality of image data, by capturing a movement of a hand or a finger of a user, using a video camera, and the like. The gesture recognition may perform complex pattern matching image processing with respect to the obtained video data or the plurality of image data, thereby recognizing a gesture.

In addition, a computer may execute a variety of processings in response to the recognized gesture.

SUMMARY

According to an aspect of an exemplary embodiment, there may be provided a device for recognizing a gesture based on a direction of movement of an object including a memory configured to store previous directional information that indicates a first direction of movement of the object, a sensor configured to sense the movement of the object and output sensor data that indicates the movement of the object, and a processor configured to determine current directional information that indicates a second direction of movement of the object based on the sensor data, and to recognize the gesture based on the first direction of movement of the object indicated by the previous directional information stored in the memory and the second direction of movement of the object indicated by the current directional information.

The processor may include a velocity generator configured to generate velocity information of the object based on the sensor data, a direction generator configured to generate the current directional information based on the velocity information, a direction quantization unit configured to quantize the second direction of movement of the object indicated by the current directional information to one of a plurality of predetermined directions, and a gesture recognition unit configured to recognize the gesture based on the first direction of movement of the object and the quantized second direction of movement of the object.

The processor may recognize the gesture while the device is in a sleep mode, and activate the device in response to recognizing the gesture.

The memory may store a predetermined operation corresponding to the gesture, and the processor is configured to perform the predetermined operation in response to recognizing the gesture.

The object may be the device or another object other than the device.

The sensor may include at least one of an acceleration sensor, an image sensor, and an optical flow sensor.

The memory may store a lookup table corresponding to the gesture, the lookup table having values assigned to transitions between the first direction of movement of the object and the second direction of movement of the object, and the processor is configured to increase or decrease a variable based on the value of the lookup table corresponding to the transition between the first direction of movement and the second direction of movement, and to recognize the gesture by comparing the variable to a predetermined threshold value.

According to an aspect of an exemplary embodiment, there may also be provided method of recognizing a gesture based on a direction of movement of an object, the method including sensing the movement of the object and generating sensor data that indicates the movement of the object, determining current directional information that indicates a current direction of movement of the object based on the sensor data, obtaining previous directional information that indicates a previous direction of movement of the object, and recognizing the gesture based on the current direction of movement of the object indicated by the current directional information and the previous direction of movement of the object indicated by the previous directional information.

The determining may include generating velocity information of the object based on the sensor data, generating the current directional information based on the velocity information, and quantizing the current direction of movement of the object indicated by the current directional information to one of a plurality of predetermined directions.

The method may further include switching a mode of a device from a sleep mode to an active mode in response to recognizing the gesture.

The recognizing may include increasing or decreasing a variable based on a value of a predetermined lookup table assigned to a transition between the current direction of movement of the object and the previous direction of movement of the object based on the transition between the previous direction of movement of the object and the current direction of movement of the object, comparing the variable to a predetermined threshold value, and recognizing the gesture based on a result of the comparing.

According to an aspect of an exemplary embodiment, there may be provided a motion recognition device including a memory configured to store a direction sequence estimator that indicates a sequence of movement directions of a gesture, a sensor configured to sense movement of an object, and a processor configured to determine a sequence of movement directions of the object from the movement of the object sensed by the sensor, compare the sequence of movement directions of the object to the to the sequence of movement directions of the gesture pattern, and determine whether the sequence of movement directions of the object corresponds to the sequence of movement directions of the gesture pattern.

Other aspects will be apparent from the following detailed description and the drawings.

BRIEF DESCRIPTION OF THE DRAWINGS

FIGS. 4A through 4D are diagrams illustrating an operation of a gesture recognition unit according to an exemplary embodiment.

DETAILED DESCRIPTION

Figure 1:
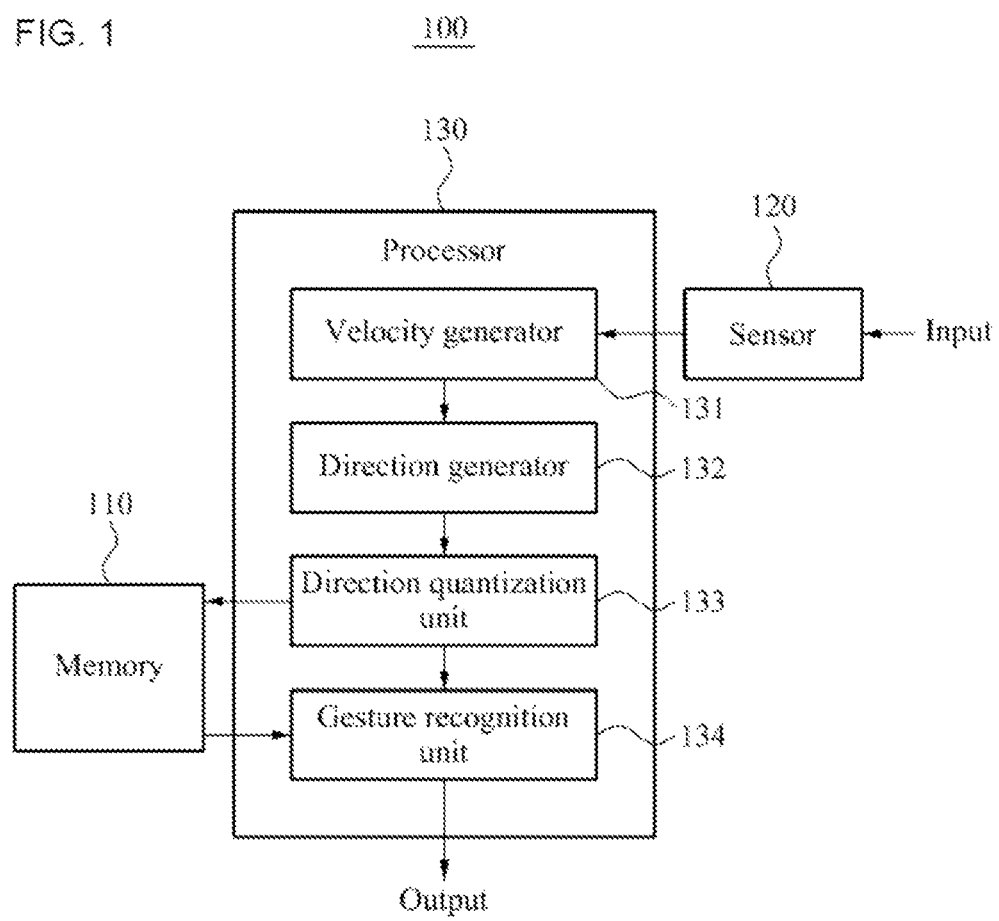
FIG. 1 is a block diagram illustrating a device for recognizing a predetermined gesture according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed, with the exception of steps and/or operations necessarily occurring in a particular order. In addition, respective descriptions of well-known functions and constructions may be omitted for increased clarity and conciseness.

FIG. 1 is a block diagram illustrating a device 100 for recognizing a predetermined gesture according to an exemplary embodiment.

Referring to FIG. 1, the device 100 may include a memory 110, a sensor 120, and a processor 130. Here, the device 100 refers to a device capable of recognizing a gesture, and may include, for example, a mobile terminal, and the like. Hereinafter, the device 100 may refer to the mobile terminal.

In this instance, the sensor 120 may sense an object and generate sensor data associated with a predetermined gesture performed by the object. In particular, the sensor data may include information to be used for determining whether the gesture being input corresponds to the predetermined gesture. The gesture may be input by a user, for example with a user's hand.

The sensor 120 may include an image sensor. In this instance, the sensor 120 may generate a plurality of successive images to verify a trajectory of hand movement of the user. The sensor 120 may include an acceleration sensor. In this instance, the sensor 120 may generate acceleration information in order to verify a trajectory of the mobile terminal 100 moved by the user. A detailed description on the sensor 120 will be further provided with reference to FIG. 2.

In addition, the processor 130 may determine current directional information based on the sensor data generated by the sensor 120. Here, the current directional information may include at least one of information related to a movement direction of the mobile terminal 100 and information related to a movement direction of an object sensed by the sensor 120.

In particular, the processor 130 may determine a direction in which the mobile terminal 100 is currently being moved, or a direction in which the object sensed by the sensor 120 moves, based on the sensor data generated by the sensor 120. Here, the object may correspond to, for example, a hand of the user.

The processor 130 may include a velocity generator 131, a direction generator 132, a direction quantization unit 133, and a gesture recognition unit 134.

The velocity generator 131 may generate velocity information based on the sensor data generated by the sensor 120. Here, the velocity information may correspond to a vector, and may include magnitude information and directional information.

The direction generator 132 may extract directional information based on the velocity information generated by the velocity generator 131. For example, the direction generator 132 may determine whether the directional information included in the velocity information is meaningful, for example larger than a predetermined threshold value, based on the magnitude information included in the velocity information. When it is determined that the directional information included in the velocity information is meaningful, the direction generator 132 may extract the directional information included in the velocity information.

The direction quantization unit 133 may quantize the directional information extracted by the direction generator 132 to one of a plurality of predetermined directions. In addition, the direction quantization unit 133 may determine the current directional information based on the quantized directional information.

Operations of the velocity generator 131, the direction generator 132, and the direction quantization unit 133 will be further described in detail with reference to FIGS. 2 and 3.

In addition, the processor 130 may store the directional information in the memory 110 in real time. In this instance, a point in time at which the processor 130 stores the directional information in the memory 110 may be referred to as a first point in time and may be associated with the stored information. The processor 130 may utilize directional information stored in the memory 110 at a second point in time occurring after the first point in time, thereby recognizing the gesture being input by the user based on at least one of the directional information at the first point in time and the directional information at the second point in time. In this regard, the gesture may be determined from a sequence of detected directional movements corresponding to the directional information, as will be discussed in detail below.

In particular, at least one piece of directional information may be stored in the memory 110. Here, the at least one piece of directional information may include directional information determined by the processor 130 for at least one previous point in time, for example, directional information at a corresponding point in time.

Accordingly, the at least one piece of previous directional information may include at least one of the information related to the movement direction of the mobile terminal 100 and the information related to the movement direction of the subject sensed by the sensor 120.

In addition, the processor 130 may recognize the gesture being input by the user, based on the current directional information and the at least one piece of previous directional information. In other words, the processor 130 may recognize the gesture based on the previous directional information associated with a first time and current directional information associated with a second time, where the previous directional information and the current directional information may represent a sequence of directional movements. As such, the terms 'current' and 'previous' are simply explanatory terms to describe a first movement direction and a second movement direction performed at different times, where a transition between the directions may be used to detect a gesture, as will be discussed below.

The processor 130 may further include a gesture recognition unit 134.

The gesture recognition unit 134 may obtain the at least one piece of previous directional information from the memory 110, and obtain the current directional information determined by the direction quantization unit 133.

In addition, the gesture recognition unit 134 may utilize a direction sequence estimator to recognize the gesture being input by the user, based on the current directional information and the at least one piece of previous directional information.

A further detailed description on the direction sequence estimator will be provided with reference to FIGS. 4A through 4D.

In addition, the processor 130 may recognize the gesture being input by the user, in a sleep mode and the processor 130 may awaken the mobile terminal 100 in response to recognizing the corresponding gesture.

For example, the mobile terminal 100 may use a simple operation, other than complex image processing, to provide technology for recognizing a gesture in a sleep mode. In particular, the mobile terminal 100 may reduce an amount of power to be used for recognizing the gesture. A further detailed description on the operation performed for gesture recognition of the mobile terminal 100 will be provided hereinafter.

The memory 110 may store a predetermined operation corresponding to a gesture. In this instance, the processor 130 may perform the predetermined operation corresponding to the gesture, in response recognizing the corresponding gesture.

Figure 2:
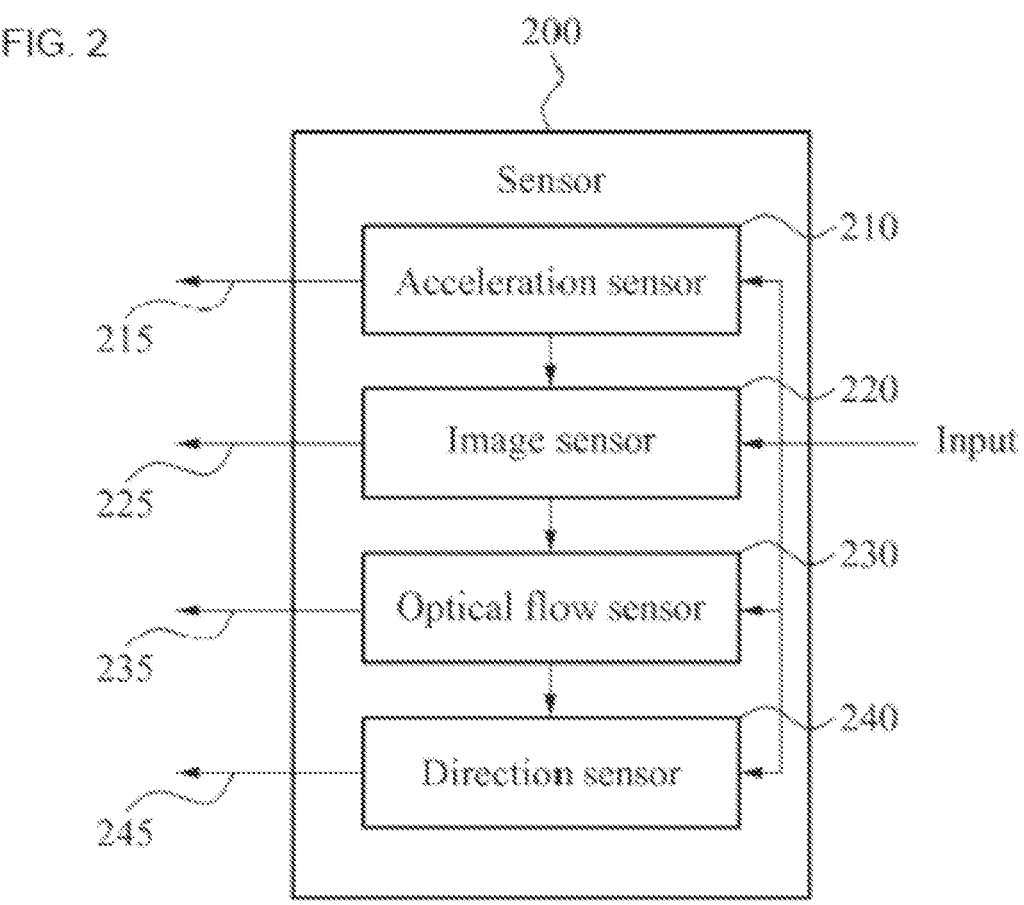
FIG. 2 is a block diagram illustrating a sensor according to an exemplary embodiment.

FIG. 2 is a block diagram illustrating a sensor 200 according to an exemplary embodiment.

Referring to FIG. 2, the sensor 200 may include at least one of the acceleration sensor 210, the image sensor 220, an optical flow sensor 230, and a direction sensor 240.

The acceleration sensor 210 may generate sensor data to be used for recognizing a gesture based on a movement of a mobile terminal. For example, the sensor data generated by the acceleration sensor 210 may include acceleration information 215. In particular, the acceleration information 215 may include information related to an acceleration generated when the mobile terminal is moved by a user.

In this instance, the velocity generator 131 of FIG. 1 may generate velocity information, for example, a moving velocity of the mobile terminal, based on the acceleration information 215. In particular, since a velocity may be obtained by integrating an acceleration, the velocity generator 131 may calculate the velocity information, for example, the moving velocity of the mobile terminal, by accumulating the acceleration information 215.

The velocity generator 131 may apply various schemes in order to reduce an error occurring while an accumulation of the acceleration information 215 is calculated. For example, the velocity generator 131 may apply a scheme of reducing an error by correcting a posture of the mobile terminal, for example, a tilt, and excluding a gravity acceleration component from the corrected acceleration information, and the like.

The image sensor 220 may generate sensor data to be used for recognizing a gesture based on a movement of an object, for example, a hand of a user. For example, the sensor data generated by the image sensor 220 may include at least two pieces of successive image data 225.

In particular, the at least two pieces of successive image data 225 may include information related to a change in a position of the object, for example, the hand of the user, sensed by the image sensor 220.

In this instance, the velocity generator 131 of FIG. 1 may generate velocity information, for example, a moving velocity of the object, based on the at least two pieces of successive image data 225.

In particular, the velocity generator 131 may obtain information related to a time interval between times at which the at least pieces of two successive image data 225 are captured, respectively. The velocity generator 131 may extract the information related to the change in the position of the object from the at least two pieces of successive image data 225, through image processing.

Here, the velocity generator 131 may apply various schemes in order to extract the information related to the change in the position of the object. For example, the velocity generator 131 may apply a scheme of separating a background and a moving object from each of the at least two pieces of successive image data 225, a scheme of calculating a center of the separated moving object, and the like. The velocity generator 131 may generate the information related to the change in the position of the subject, based on a change in a position of the center of the moving object.

In addition, the velocity generator 131 may calculate the velocity information, for example, the moving velocity of the subject, by dividing a changed position of the object by the time interval between the times at which the at least two pieces of successive image data 225 are captured, respectively.

Also, the image sensor 220 may generate sensor data to be used for recognizing a gesture based on a movement of the mobile terminal. For example, at least two pieces of successive image data 225 generated by the image sensor 220 may include information related to a degree to which the entire image to be captured is substantially moved while the mobile terminal is moved by the user.

In this instance, the velocity generator 131 of FIG. 1 may generate velocity information, for example, a moving velocity of the mobile terminal, based on the at least two pieces of successive image data 225.

In particular, the velocity generator 131 may extract information related to a change in a position of the mobile terminal from the at least two pieces of successive image data 225, through image processing. Here, the velocity generator 131 may apply various schemes in order to extract the information related to the change in the position of the mobile terminal. Accordingly, the directional information related to the change in position may be obtained, and a complex pattern matching image processing may be avoided.

For example, the velocity generator 131 may apply a scheme of extracting pixels corresponding to each other from each of the at least two pieces of successive image data 225 and calculating a change in positions of the corresponding pixels, and the like. The velocity generator 131 may generate the information related to the change in the position of the mobile terminal, based on the change in the positions of the corresponding pixels.

In addition, the velocity generator 131 may calculate the velocity information, for example, a moving velocity of the mobile terminal, by dividing a changed position of the mobile terminal by a time interval between times at which the at least two pieces of successive image data 225 are captured, respectively.

The optical flow sensor 230 may generate sensor data to be used for recognizing a gesture based on a movement of an object, for example, a hand of a user. For example, the sensor data generated by the optical flow sensor 230 may include an optical flow 235.

Here, optical flow refers to information including a velocity vector of at least one pixel. The velocity vector of the pixel may correspond to a two-dimensional vector having a predetermined direction and predetermined magnitude on a two-dimensional plane including a plurality of pixels in an image data. In this instance, a start position of the velocity vector of the pixel may correspond to a position of a corresponding pixel on the two-dimensional plane.

For example, when temporally successive images are acquired using a camera, the brightness of each pixel in the images changes when the input object moves. In this example, the optical flow may include a movement of brightness in the images in a form of a two-dimensional vector.

Here, the optical flow 235 may include a velocity vector of at least one pixel in which a new event occurs. In particular, the optical flow 235 may include a velocity vector of at least one pixel in which a predetermined event occurs, among a plurality of pixels.

In this instance, each velocity vector may correspond to a two-dimensional (2D) vector having a predetermined magnitude and direction on a 2D plane including a plurality of pixels. A start position of each velocity vector may correspond to a position of a corresponding pixel.

For example, when temporally successive images are acquired using a camera while a position of the camera is moved based on the object, or the object is moved based on the camera, brightness of each pixel in the images may be changed. An optical flow may include such a change of brightness in the images, in a form of a 2D vector.

In particular, the optical flow 235 may include information related to a moving velocity of the subject, for example, the hand of the user, sensed by the optical flow sensor 230.

In this instance, the velocity generator 131 of FIG. 1 may generate velocity information, for example, the moving velocity of the subject, based on the optical flow 235.

In particular, the velocity generator 131 may obtain information related to a time interval between times at which two images used by the optical flow sensor 230 for generating the optical flow 235 are captured. The velocity generator 131 may extract information related a change in a position of the object from the optical flow 235.

Here, the velocity generator 131 may apply various schemes in order to generate the velocity information, for example, the moving velocity of the subject. For example, the velocity generator 131 may apply a scheme of calculating the information related to the change in the position of the object by calculating an average of velocity vectors of a plurality of pixels included in the optical flow 235, and the like. Thus, in the case of using the optical flow sensor according to an exemplary embodiment, the gesture recognition unit does not require separate image processing for obtaining a velocity of the input object. The gesture recognition unit may obtain the movement direction of the input object, using a simple operation, such as, calculating the average of a plurality of velocity vectors included in the optical flow.

In addition, the velocity generator 131 may calculate the velocity information, for example, the moving velocity of the subject, by dividing a changed position of the object by the time interval between the times at which the two images used by the optical flow sensor 230 for generating the optical flow 235 are captured.

Also, the optical flow sensor 230 may generate sensor data to be used for recognizing a gesture based on a movement of a mobile terminal. For example, an optical flow 235 generated by the optical flow sensor 230 may include information related to a degree to which the entire image to be captured is substantially moved while the mobile terminal is moved by the user.

In this instance, the velocity generator 131 of FIG. 1 may generate velocity information, for example, a moving velocity of the mobile terminal, based on the optical flow 235.

In particular, the velocity generator 131 may extract information related to a change in a position of the mobile terminal from the optical flow 235. Here, the velocity generator 131 may apply various schemes in order to extract the information related to the change in the position of the mobile terminal.

For example, the velocity generator 131 may apply a scheme of calculating the information related to the change in the position of the mobile terminal by calculating an average of velocity vectors of a plurality of pixels included in the optical flow 235 and rotating a direction of the calculated average velocity vector at 180 degrees, and the like.

In addition, the velocity generator 131 may calculate the velocity information, for example, the moving velocity of the mobile terminal, by dividing a changed position of the mobile terminal by a time interval between times at which two images used by the optical flow sensor 230 for generating the optical flow 235 are captured.

A sensor 200 according to another embodiment may include a directional sensor 240. In this instance, the directional sensor 240 may output a sensor data 245 for measuring the movement direction of an input object. The directional sensor 240 may be implemented in by various manners.

For example, the directional sensor 240 may include a plurality of photodiodes arranged in a form of matrix. The directional sensor 240 may measure the movement direction of the input object through a change of the light being input to each of a plurality of photodiodes. In particular, when the input object is moved, the amount of the light allowed to each of a plurality of photo diodes may be changed. In this example, the directional sensor 240 may output the sensor data 245 including the change of the light, and a processor may calculate the movement direction of the input object by using the sensor data, according to circumstances.

As an alternative, the directional sensor 240 may include an event-based image sensor. Here, the event-based image sensor may asynchronously generate the output signal in a pixel in which an event occurs, in response to the predetermined event, by way of example, when a luminance is greater than a predetermined threshold value. In this instance, a memory 110 of FIG. 1 may store a plurality of time stamps corresponding to a plurality of pixels included in a sensing area of the event-based image sensor. Here, the processor 130 of FIG. 1 may update the time stamp corresponding to the pixel in which the event occurs. Furthermore, the processor 130 of FIG. 1 may calculate the movement direction of the input object based on the updated time stamps. In particular, when the time stamp is closer to the current time, the event is a recent occurrence, and when the time stamp is distant from the current time, the event is an older occurrence. Accordingly, the processor 130 of FIG. 1 may predict the movement direction of the input object by analyzing the time stamps.

Figure 3:
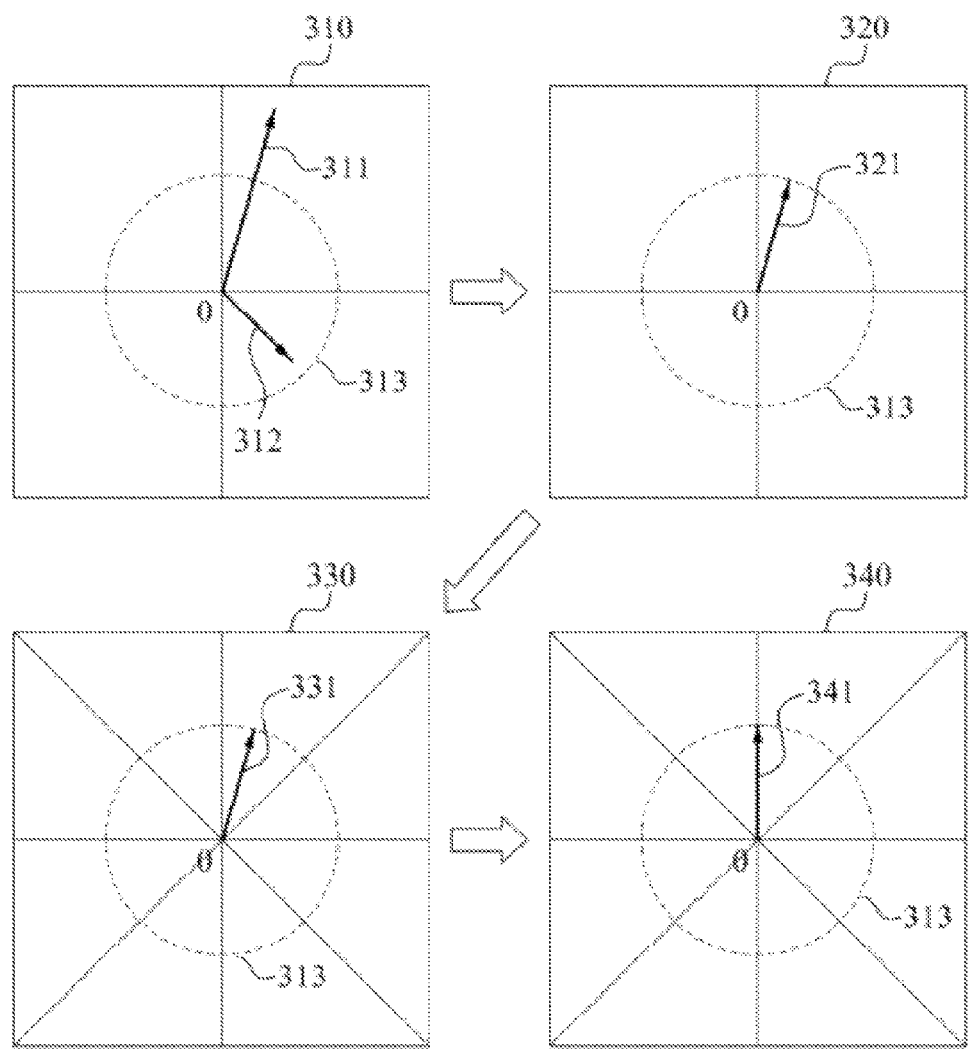
FIG. 3 is a diagram illustrating operations of a direction generator according to an exemplary embodiment.

FIG. 3 is a diagram illustrating operations of a direction generator and a direction quantization unit according to an exemplary embodiment.

Referring to FIG. 3, velocity information may correspond to a vector including magnitude information and directional information. For example, referring to four quadrants 310, a vector 311 may be a vector having a magnitude greater than a unit circle 313 and a direction toward a relative 1 o'clock direction. A vector 312 may be a vector having a magnitude less than the unit circle 313 and a direction toward a relative 5 o'clock direction.

As described with reference to FIG. 1, the direction generator 132 may generate directional information, based on velocity information generated by the velocity generator 131.

In particular, the direction generator 132 may generate a vector having a unit magnitude, based on the magnitude information included in the velocity information. In this instance, the generated vector of the unit magnitude may have a direction corresponding to the directional information included in the velocity information. In particular, the directional information may include the vector of the unit magnitude.

For example, referring to the four quadrants 320, the direction generator 132 may receive an input of the vector 311 and generate a vector 321. When it is determined that the vector 311 has a magnitude greater than the unit circle 313, the direction generator 132 may generate the vector 321 having a unit magnitude, in a direction identical to the direction of the vector 311.

The direction generator 132 may filter an input vector based on the magnitude information included in the velocity information. For example, the direction generator 132 may receive an input of the vector 312 and may not generate an output. In particular, when it is determined that the vector 312 has a magnitude less than the unit circle 313, the direction generator 132 may regard the input vector 312 as noise. In this instance, although the vector 312 is input, the direction generator 132 may ignore the input vector and may not generate directional information corresponding to the vector 312.

In addition, the direction quantization unit 133 of FIG. 1 may generate current directional information based on the directional information generated by the direction generator 132. Here, the current directional information may include quantized directional information.

In particular, the direction quantization unit 133 may classify the directional information generated by the direction generator 132 as corresponding to one of directions. Here, the directions may be divided based on a predetermined interval and may include directions of 360 degrees divided based on a predetermined interval. For example, the directions divided into four 90 degree sections, eight 45 degree sections, sixteen 22.5 degree sections, or the like.

For example, referring to octants 330 and octants 340, the direction quantization unit 133 may use directions of 360 degrees divided into eight sections. The direction quantization unit 133 may receive directional information 331 from the direction generator 132. The direction quantization unit 133 may determine a direction closest to the received directional information 311, among the directions of 360 degrees divided into eight sections.

The direction quantization unit 133 may determine that the received directional information 331 is relatively closest to a 12 o'clock direction, and generate a vector 341 having a unit magnitude and a direction toward the 12 o'clock direction. Here, the vector 341 may correspond to quantized directional information. The current directional information generated by the direction quantization unit 133 may include the vector 341.

In particular, the direction quantization unit 133 may quantize the directional information 311, thereby determining the current directional information including the vector 341.

FIGS. 4A through 4D are diagrams illustrating an operation of a gesture recognition unit according to an exemplary embodiment.

Figure 4B:
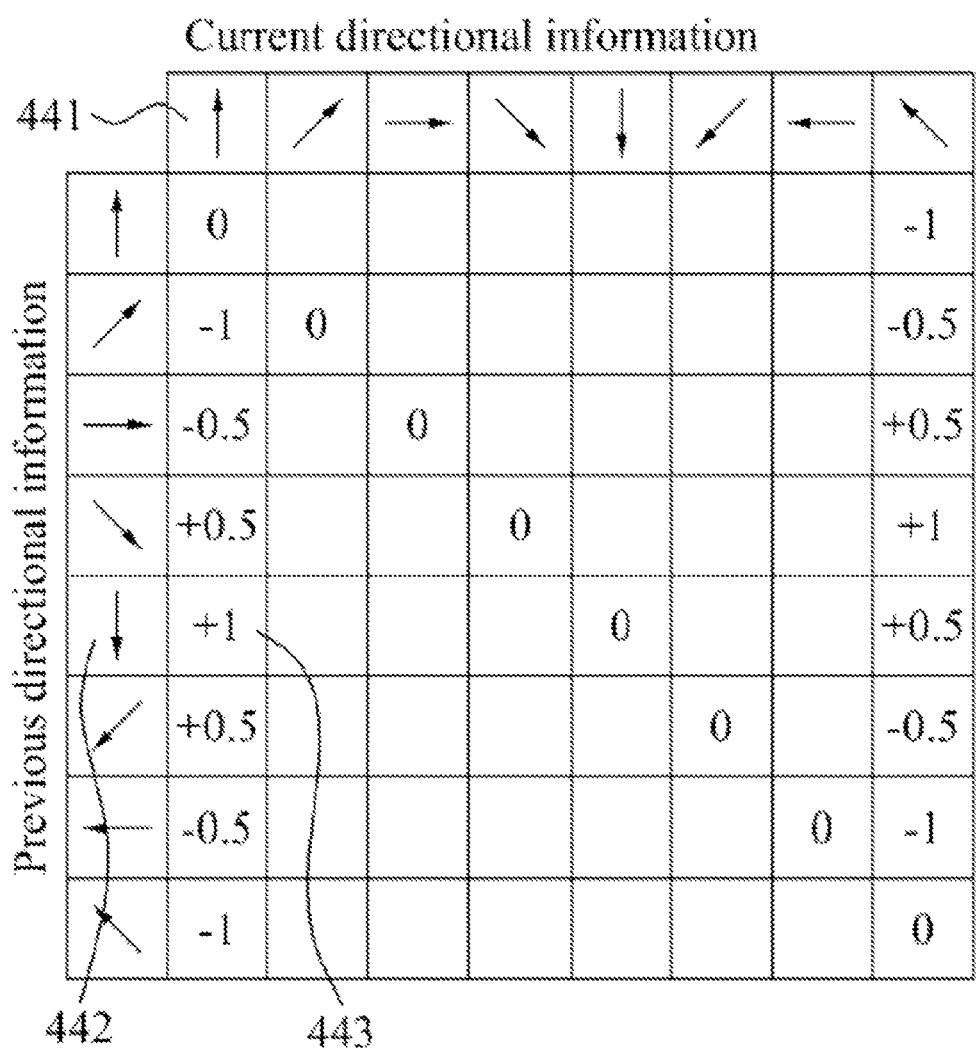

Referring to FIG. 4A, the mobile terminal may recognize a gesture being input by a user, using a direction sequence estimator. For example, a first direction sequence estimator may include a plurality of fully connected directed graphs illustrated in FIG. 4A. Here, a plurality of fully connected directed graphs illustrated in FIG. 4A may correspond to a first gesture pattern 410, and the first direction sequence estimator may be implemented in various forms. For instance, the first direction sequence estimator may correspond to a lookup table illustrated in FIG. 4B.

In particular, the gesture recognition unit 134 of FIG. 1 may obtain at least one piece of previous directional information from the memory 110, and obtain current directional information determined by the direction quantization unit 133.

In this instance, the gesture recognition unit 134 may utilize the direction sequence estimator for recognizing the gesture being input by the user based on the current directional information and the at least one piece of previous directional information.

The direction sequence estimator may be implemented by a fully connected network. In particular, the direction sequence estimator may include a plurality of nodes, and the plurality of nodes may be connected to one another through an edge.

Here, the plurality of nodes included in the direction sequence estimator may correspond to directions divided by the direction quantization unit 133 based on a predetermined interval, respectively. The edge may have a directivity. For example, a node associated with previous directional information may be disposed at a starting portion of the edge, and a node associated with current directional information may be disposed at an ending portion of the edge.

The direction sequence estimator may output a single scalar value V. A plurality of edges may respectively include a predetermined increase or decrease value. Accordingly, the gesture recognition unit 134 may increase or decrease the scalar value V based on an increase or decrease value of an edge connecting the node associated with the previous directional information to the node associated with the current directional information.

In this instance, an increase or decrease value included in each of the plurality of edges may be determined based on a predetermined gesture.

According to an exemplary embodiment, an edge corresponding to a predetermined gesture pattern may have a larger value, and an edge that does not correspond to a predetermined gesture pattern may have lower value. Depending on a particular case, an edge that does not correspond to a predetermined gesture pattern may have negative value.

For example, it may be assumed that a first edge from a node 421 to a node 420 most corresponds to a predetermined gesture pattern 410, and a second edge from a node 423 to a node 420 does not correspond to a predetermined gesture pattern 410. Further, it may be assumed that a third edge from a node 422 to a node 420 somewhat corresponds to a predetermined gesture pattern 410, but does not as closely correspond as the first edge, yet more closely corresponds to a predetermined gesture pattern 410 more than the second edge.

Here, the maximum increase value may be assigned to the first edge, the maximum decrease value may be assigned to the second edge, and the general increase value may be assigned to the third edge. In this instance, the general increase value is a value between the maximum increase value and the maximum decrease value, for example, +0.5.

For example, a direction sequence estimator may be provided to recognize a predetermined gesture 410 of moving up and down. When previous directional information corresponds to a 6 o'clock direction 421 and current directional information corresponds to a 12 o'clock direction 420, the gesture recognition unit 134 may determine that a gesture being input corresponds to the predetermined gesture 410. Accordingly, the direction sequence estimator may set an increase or decrease value of an edge from the 6 o'clock direction 421 to the 12 o'clock direction 420 to a maximum increase value, for example, "+1".

Although not shown in FIG. 4A, the gesture recognition unit 134 may also determine that the gesture being input corresponds to the predetermined gesture 410 when the previous directional information corresponds to a 12 o'clock direction and the current directional information corresponds to a 6 o'clock direction. Accordingly, the direction sequence estimator may set an increase or decrease value of an edge from the 12 o'clock 420 direction to the 6 o'clock 421 direction to a maximum increase value, for example, "+1".

When a gesture conflicting with the predetermined gesture 410 is input, the direction sequence estimator may decrease an increase or decrease value of a corresponding edge from a maximum increase value.

For example, when the previous directional information corresponds to a 5 o'clock or 7 o'clock direction 422 and the current directional information corresponds to the 12 o'clock direction 420, the gesture recognition unit 134 may determine that the gesture being input is conflicting with the predetermined gesture 410. However, the gesture recognition unit 134 may determine that an error of the gesture being input is within a range of tolerance. Accordingly, the direction sequence estimator may set an increase or decrease value of an edge from the 5 o'clock or 7 o'clock direction 422 to the 12 o'clock direction 420 to a general increase value, for example, "+0.5".

In addition, when the previous directional information corresponds to an 11 o'clock or 1 o'clock direction 423, and the current directional information corresponds to the 12 o'clock direction 420, the gesture recognition unit 134 may determine that the gesture being input is completely conflicting with the predetermined gesture 410. Accordingly, the direction sequence estimator may set an increase or decrease value of an edge from the 11 o'clock or 1 o'clock direction 423 to the 12 o'clock direction 420 to a maximum decrease value, for example, "−1".

The gesture recognition unit 134 may calculate an output value V of the direction sequence estimator, based on the previous directional information and the current directional information. In particular, the gesture recognition unit 134 may select a single edge within the direction sequence estimator based on the previous directional information and the current directional information, and increase or decrease the output value V by an increase or decrease value included in the corresponding edge.

Accordingly, the gesture recognition unit 134 may increase the output value V when a gesture corresponding to the predetermined gesture 134 is input, and may decrease the output value V when a gesture conflicting with the predetermined gesture 134 is input.

In addition, the gesture recognition unit 134 may compare the output value V to a predetermined threshold value to determine whether the gesture being input is to be recognized as the predetermined gesture 410. In particular, the gesture recognition unit 134 may compare the output value V to the predetermined threshold value each time the output value V is increased or decreased based on the gesture being input. The gesture recognition unit 134 may recognize the gesture being input as the predetermined gesture 410 when the output value V is greater than the predetermined threshold value.

Accordingly, the mobile terminal may provide technology for adjusting a sensitivity of gesture recognition by adjusting the predetermined value.

Also, when a moving velocity of a gesture being input is greater than or equal to a predetermined velocity, the mobile terminal may recognize the gesture based on a direction of the gesture being input, irrespective of a scale of the gesture being input. Accordingly, the mobile terminal may provide technology for recognizing a gesture being input in a scale-free manner.

In addition, the mobile terminal may recognize a gesture based on a direction of the gesture being input, irrespective of a relative position at which the gesture is input in an image region sensed by an image sensor or an optical flow sensor. In particular, the mobile terminal may recognize a gesture being input in a position-free manner, without performing image processing of moving the gesture being input to a center of the image region sensed by the image sensor or the optical flow sensor.

Further, the mobile terminal may adjust an increase or decrease value included in an edge within the direction sequence estimator, thereby providing technology for recognizing a gesture being input in an orientation-free manner.

In particular, the direction sequence estimator may consider both an absolute direction of the predetermined gesture 410 and a relative direction of the predetermined gesture 410.

For example, when the previous directional information corresponds to a 5 o'clock direction 431 and the current directional information corresponds to an 11 o'clock direction 430, the gesture recognition unit 134 may determine that the gesture being input corresponds to the predetermined gesture 410. Accordingly, the direction sequence estimator may set an increase or decrease value of an edge from the 5 o'clock direction 431 to the 11 o'clock direction 430 to a maximum increase value, for example, "+1".

Similarly, when the previous directional information corresponds to a 6 o'clock or 4 o'clock direction 432 and the current directional information corresponds to the 11 o'clock direction 430, the gesture recognition unit 134 may determine that the gesture being input is conflicting with the predetermined gesture 410. However, the gesture recognition unit 134 may determine an error of the gesture being is within a range of tolerance. Accordingly, the direction sequence estimator may set an increase or decrease value of an edge from the 6 o'clock or 4 o'clock direction 432 to the 11 o'clock direction 430 to a general increase value, for example, "+0.5".

In addition, when the previous directional information corresponds to a 9 o'clock or 12 o'clock direction 433, and the current directional information corresponds to the 11 o'clock 430, the gesture recognition unit 134 may determine that the gesture being input is completely conflicting with the predetermined gesture 410. Accordingly, the direction sequence estimator may set an increase or decrease value of an edge from the 9 o'clock or 12 o'clock direction 433 to the 11 o'clock direction 430 to a maximum decrease value, for example, "−1".

Although not shown in FIG. 4A, the direction sequence estimator may set an increase or decrease value of an edge, in a similar manner, when the current directional information corresponds to one of the other six directions, excluding the 12 o'clock direction 420 and the 11 o'clock direction 430.

Accordingly, the gesture recognition unit 134 may consider both the absolute direction of the predetermined gesture 410 and the relative direction of the predetermined gesture 410. The mobile terminal may provide technology for recognizing a gesture being input in an orientation-free manner.

Referring to FIG. 4B, a direction sequence estimator according to an exemplary embodiment may be implemented by a single lookup table 440.

Here, the lookup table 440 may refer to a data structure by which the direction sequence estimator is implemented. A predetermined gesture may correspond to a single lookup table. A column of the lookup table 440 may correspond to current directional information, and a row of the lookup table 440 may correspond to previous directional information. A value stored in a position at which a column corresponding to previous directional information and a row corresponding to current directional information meet may be an increase or decrease value of an edge from a node corresponding to the previous directional information to a node corresponding to the current directional information.

For example, when the current directional information corresponds to a 12 o'clock direction 441 and the previous directional information corresponds to a 6 o'clock direction 442, an increase or decrease value of a corresponding edge may be a maximum increase value 443, for example, "+1". When the current directional information is identical to the previous directional information, an increase or decrease value of a corresponding edge may be "0". Although the lookup table 440 contains values only for the two cases described above, other examples may be understood explicitly by those of ordinary skill in the art and thus, a detailed description will be omitted for conciseness.

According to another exemplary embodiment, the direction sequence estimator may use at least two pieces of previous directional information for recognizing a gesture being input by the user. In this instance, the direction sequence estimator may be implemented by a three-dimensional (3D) or higher-dimensional lookup table. It is apparent that the exemplary embodiments can be readily expanded to a configuration of using at least two pieces of previous directional information.

Referring to FIG. 4C, a direction sequence estimator according to another exemplary embodiment may recognize a predetermined gesture 450 moving counterclockwise in a circular pattern.

When previous directional information corresponds to a 1 o'clock direction 461 and current directional information corresponds to a 12 o'clock direction 460, the gesture recognition unit 134 of FIG. 1 may determine that a gesture being input corresponds to the predetermined gesture 450. Accordingly, the direction sequence estimator may set an increase or decrease value of an edge from the 1 o'clock direction 461 to the 12 o'clock direction 460 to a maximum increase value, for example, "+1".

In addition, when the previous directional information corresponds to a 6 o'clock direction 462 and the current directional information corresponds to the 12 o'clock direction 460, the gesture recognition unit 134 may determine that the gesture being input conflicts with the predetermined gesture 450. Accordingly, the direction sequence estimator may set an increase or decrease value of an edge from the 6 o'clock direction 462 to the 12 o'clock direction 460 to "0".

Further, when the previous directional information corresponds to an 11 o'clock direction 463 and the current directional information corresponds to the 12 o'clock 460, the gesture recognition unit 134 may determine that the gesture being input completely conflicts with the predetermined gesture 450. Accordingly, the direction sequence estimator may set an increase or decrease value of an edge from the 11 o'clock direction 463 to the 12 o'clock direction 460 to a maximum decrease value, for example, "−1".

Similarly, the mobile terminal may adjust an increase or decrease value included in an edge within the direction sequence estimator, thereby recognizing a gesture being input in an orientation-free manner.

In particular, the gesture recognition unit 134 may also determine that the gesture being input corresponds to the predetermined gesture 450 when the previous directional information corresponds to a 12 o'clock direction 471 and the current directional information corresponds to an 11 o'clock direction 470. Accordingly, the direction sequence estimator may set an increase or decrease value of an edge from the 12 o'clock direction 471 to the 11 o'clock direction 470 to a maximum increase value, for example, "+1".

In addition, when the previous directional information corresponds to a 5 o'clock direction 472 and the current directional information corresponds to the 11 o'clock direction 470, the gesture recognition unit 134 may determine that the gesture being input conflicts with the predetermined gesture 450. Accordingly, the direction sequence estimator may set an increase or decrease value of an edge from the 5 o'clock direction 472 to the 11 o'clock direction 470 to "0".

Further, when the previous directional information corresponds to a 9 o'clock direction 473 and the current directional information corresponds to the 11 o'clock 470, the gesture recognition unit 134 may determine that the gesture being input completely conflicts with the predetermined gesture 450. Accordingly, the direction sequence estimator may set an increase or decrease value of an edge from the 9 o'clock direction 473 and the 11 o'clock direction 470 to a maximum decrease value, for example, "−1".

Referring to FIG. 4D, a direction sequence estimator according to still another exemplary embodiment may recognize predetermined gestures of various shapes.

For example, the direction sequence estimator may recognize a predetermined gesture 480 moving in a shape of a star. Also, the direction sequence estimator may recognize a gesture 490 arbitrarily designated by a user.

The descriptions provided with reference to FIGS. 1 through 4C may be applied to the recognition of the predetermined gesture 480 moving in the shape of the star or the gesture 490 arbitrarily designated by the user and thus, a repeated description will be omitted for conciseness.

In addition, a mobile terminal according to another exemplary embodiment may recognize a plurality of predetermined gestures. In particular, the memory 110 of FIG. 1 may store at least one piece of previous directional information, and lookup tables corresponding to the plurality of predetermined gestures. Here, each of the plurality of predetermined gestures may correspond to a single lookup table.

As described above, a lookup table may contain a unique output value V. For example, a mobile terminal capable of recognizing the predetermined gesture 480 moving in the shape of the star, and the gesture 490 arbitrarily designated by the user may be provided.

In this instance, a lookup table, hereinafter referred to as the "first lookup table", corresponding to the predetermined gesture 480 moving in the shape of the star may contain an output value $V_1$. Similarly, a lookup table, hereinafter referred to as the "second lookup table", corresponding to the gesture 490 arbitrarily designated by the user may contain an output value $V_2$.

In this instance, the processor 130 may increase or decrease the output value $V_1$ and the output value $V_2$, respectively, based on the current directional information, the previous directional information, the first lookup table, and the second lookup table.

Further, when one of the output value $V_1$ and the output value $V_2$ is greater than a predetermined threshold value, the processor 130 may determine that a gesture corresponding to the corresponding output value is recognized. For example, when the output value $V_1$ is greater than the predetermined threshold value, the processor 130 may determine that the predetermined gesture 480 moving in the shape of the star corresponding to the first lookup table is recognized.

In addition, the memory 110 may additionally store predetermined operations corresponding to the plurality of predetermined gestures. In this instance, the processor 130 may recognize one of the plurality of predetermined gestures in a sleep mode, and perform a predetermined operation corresponding to the recognized gesture in response to the recognition of one of the plurality of predetermined gestures.

Depending on a particular case, the gesture recognition unit 134 of FIG. 1 may calculate a plurality of output values using a plurality of direction sequence estimators. In this case, each direction sequence estimator may correspond to different gesture patterns.

For example, a first direction sequence estimator may include a plurality of fully connected directed graphs illustrated in FIG. 4C. Here, the plurality of fully connected directed graphs illustrated in FIG. 4C may correspond to a second gesture pattern 450.

Further, a third direction sequence estimator may include a plurality of fully connected directed graphs corresponding to a third gesture pattern 480 illustrated in FIG. 4D, and a fourth direction sequence estimator may include a plurality of fully connected directed graphs corresponding to a fourth gesture pattern 490 illustrated in FIG. 4D.

In this case, a gesture recognition unit 134 of FIG. 1 may calculate the output value of the first direction sequence estimator, the output value of the second direction sequence estimator, the output value of the third direction sequence estimator, and the output value of the fourth direction sequence estimator.

The gesture recognition unit 134 of FIG. 1 may determine the gesture pattern corresponding to the direction sequence estimator having larger output value among the calculated output values, as the recognized gesture pattern.

Depending on a particular case, the gesture recognition unit 134 of FIG. 1 may determine that the gesture pattern recognition was successfully performed when the corresponding output value is larger than a predetermined threshold value.

Figure 5:
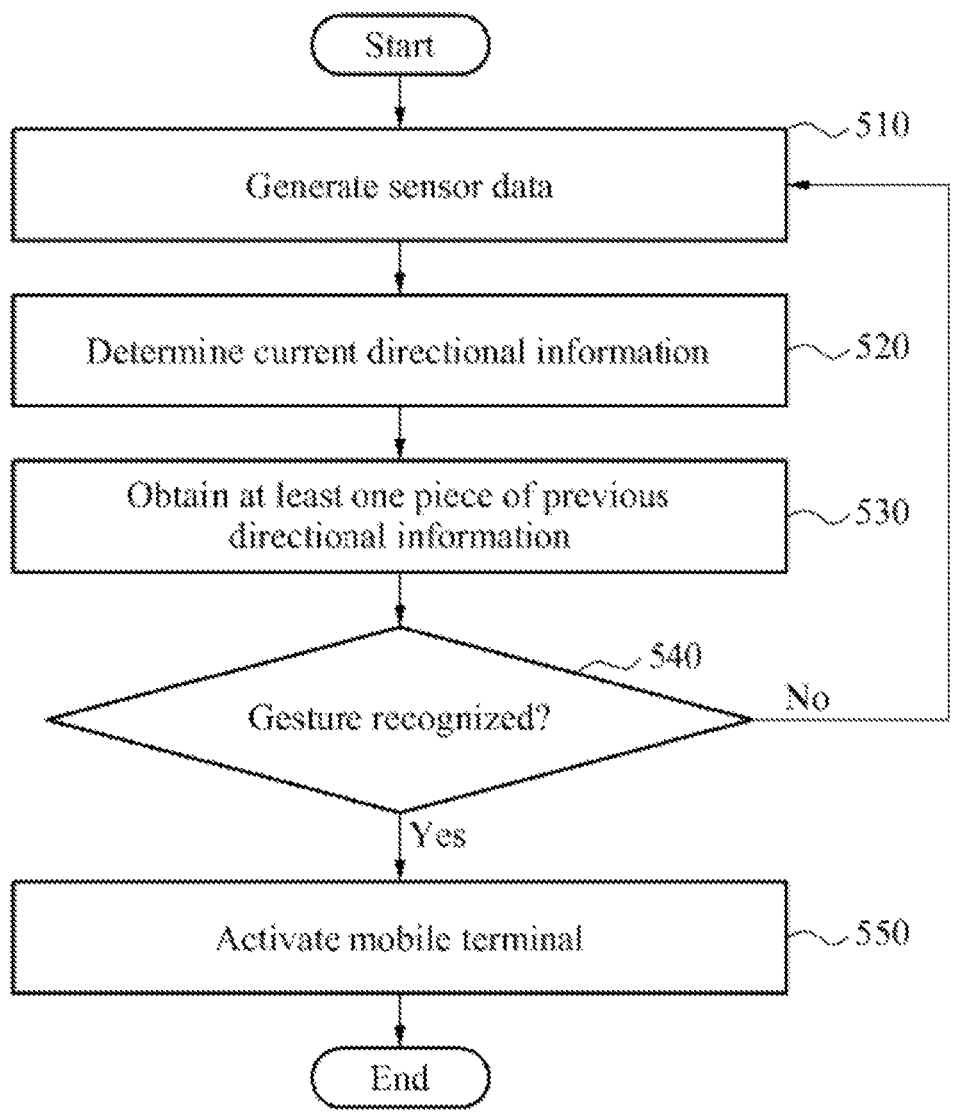
FIG. 5 is a flowchart illustrating a method of recognizing a predetermined gesture according to an exemplary embodiment.

FIG. 5 is a flowchart illustrating an operational method of a mobile terminal recognizing a predetermined gesture according to an exemplary embodiment.

Referring to FIG. 5, the operational method of the mobile terminal may include operation 510 of generating sensor data associated with a gesture using a sensor, operation 520 of determining current directional information based on the sensor data, operation 530 of obtaining at least one piece of previous directional information stored in a memory, and operation 540 of recognizing the gesture based on a transition between the current directional information and the at least one piece of previous directional information.

In this instance, in operation 520, the current directional information may be determined by generating velocity information based on the sensor data, extracting directional information based on the generated velocity information, and quantizing the extracted directional information to one of a plurality of predetermined directions.

In operation 540, a variable may be increased or decreased based on the lookup table, the current directional information, and the at least one piece of previous directional previous directional information, and the gesture may be recognized based on a result of comparing the variable to a predetermined threshold value. In this instance, the memory may additionally store the lookup table corresponding to the gesture.

In addition, the operational method of the mobile terminal may further include operation 550 of activating the mobile terminal in response to the recognition of the gesture. In this instance, in operation 540, the gesture may be recognized in a sleep mode.

The technical descriptions provided with reference to FIGS. 1 through 4D may be applied to the operations of FIG. 5 and thus, a repeated description will be omitted for conciseness.

The above-described operations of the exemplary embodiments may be recorded in non-transitory computer-readable media as program instructions to implement various operations executed by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

A number of exemplary embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A device for recognizing a gesture based on a direction of movement of an object, the device comprising:
   a memory configured to store previous directional information that indicates a first direction of movement of the object in which the object moves between a previous position and a current position;
   a sensor configured to sense the movement of the object between positions and output sensor data that indicates the movement of the object between positions; and
   a processor configured to determine current directional information that indicates a second direction of movement of the object in which the object moves between the current position and a next position based on the sensor data, to update a variable corresponding to a predetermined gesture by increasing or decreasing the variable based on an update value being assigned to a transition between the first direction of movement of the object indicated by the previous directional information stored in the memory and the second direction of movement of the object indicated by the current directional information, and to recognize the gesture by determining, based on the variable, whether the sensed movement corresponds to the predetermined gesture by comparing the variable to a predetermined threshold value.

2. The device of claim 1, wherein the processor is configured to generate velocity information of the object based on the sensor data, generate the current directional information based on the velocity information, quantize the second direction of movement of the object indicated by the current directional information to one of a plurality of predetermined directions, and recognize the gesture based on the transition between the first direction of movement of the object and the quantized second direction of movement of the object.

3. The device of claim 1, wherein the processor is configured to recognize the gesture while the device is in a sleep mode, and activate the device in response to recognizing the gesture.

4. The device of claim 1, wherein the memory is configured to store a predetermined operation corresponding to the gesture, and the processor is configured to perform the predetermined operation in response to recognizing the gesture.

5. The device of claim 1, wherein the object comprises at least one of: the device and another object other than the device.

6. The device of claim 1, wherein the sensor comprises at least one of an acceleration sensor, an image sensor, and an optical flow sensor.

7. The device of claim 1, wherein the memory stores a lookup table corresponding to the predetermined gesture, the lookup table having update values assigned to transitions between different directions of movement of the object, the update values including the update value, and
   wherein the processor is configured to increase or decrease the variable based on the update value of the lookup table corresponding to the transition between the first direction of movement and the second direction of movement, and to determining whether the sensed movement corresponds to the predetermined gesture by comparing the variable to the predetermined threshold value.

8. A method of recognizing a gesture based on a direction of movement of an object, the method comprising:
   sensing the movement of the object and generating sensor data that indicates the movement of the object;
   determining current directional information that indicates a current direction of movement of the object in which the object moves between a current position and a next position based on the sensor data;
   obtaining previous directional information that indicates a previous direction of movement of the object in which the object moves between a previous position and the current position;
   updating a variable corresponding to a predetermined gesture by increasing or decreasing the variable based on an update value being assigned to a transition between the current direction of movement of the object indicated by the current directional information and the previous direction of movement of the object indicated by the previous directional information; and
   recognizing the gesture by determining, based on the variable, whether the sensed movement corresponds to the predetermined gesture by comparing the variable to a predetermined threshold value.

9. The method of claim 8, wherein the determining comprises:
   generating velocity information of the object based on the sensor data;
   generating the current directional information based on the velocity information; and
   quantizing the current direction of movement of the object indicated by the current directional information to one of a plurality of predetermined directions.

10. The method of claim 8, further comprising:
    switching a mode of a device from a sleep mode to an active mode in response to recognizing the gesture.

11. The method of claim 8, wherein the recognizing comprises:
    increasing or decreasing the variable based on the update value of a predetermined lookup table, the update value being assigned to the transition between the current direction of movement of the object and the previous direction of movement of the object;
    comparing the variable to the predetermined threshold value; and
    recognizing the gesture based on a result of the comparing.

12. A non-transitory computer-readable medium comprising a program for instructing a computer to perform the method of claim 11.

13. A motion recognition device comprising:
    a memory configured to store a direction sequence estimator that indicates a sequence of movement directions of a gesture pattern;
    a sensor configured to sense movement of an object between positions; and
    a processor configured to determine a sequence of movement directions of the object in which the object moves between the positions from the movement of the object sensed by the sensor, update a variable corresponding to the gesture pattern by increasing or decreasing the variable based on the direction sequence estimator and update values being assigned to transitions between the sequence of movement directions of the object, determine whether the variable meets a threshold that indicates the sequence of movement directions of the object corresponds to the sequence of movement directions of the gesture pattern by comparing the variable to the threshold, and determine that the sequence of movement directions of the object corresponds to the sequence of movement directions of the gesture pattern in response to determining the variable meets the threshold.

14. The motion recognition device according to claim 13, wherein the direction sequence estimator is a fully connected graph of nodes and at and least one edge between the nodes, the nodes corresponding to movement directions including the movement directions in the sequence of movement directions of the gesture and the edges corresponding to update values assigned to transitions between the nodes.

15. The motion recognition device according to claim 13, wherein the direction sequence estimator is a lookup table comprising rows and columns corresponding to movement directions including the movement directions in the sequence of movement directions of the gesture and update values at intersections of the rows and columns corresponding to update values assigned to transitions between the movement directions.

\* \* \* \* \*